Patented June 22, 1937

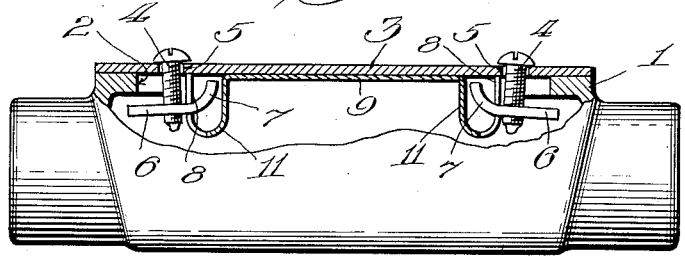
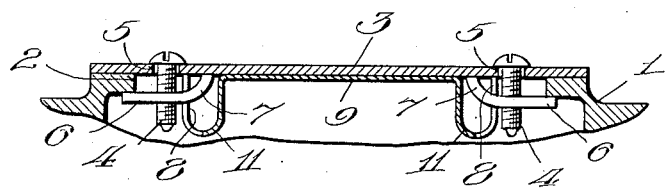
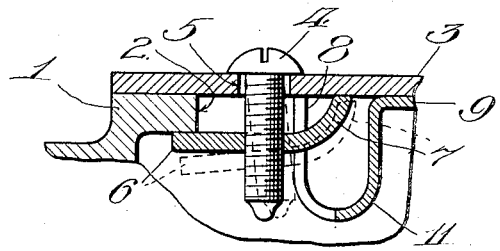
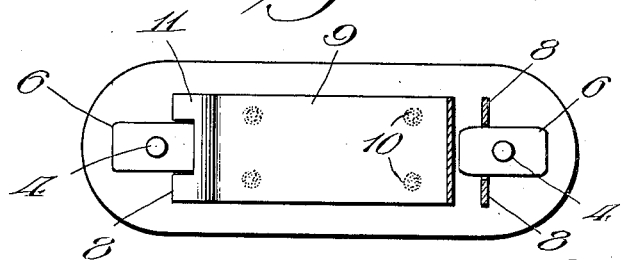

2,084,541

UNITED STATES PATENT OFFICE 2,084,541

COVER ATTACHING MEANS

Nils A. Tornblom, Chicago, Ill., assignor to Appleton Electric Company, a corporation of Illinois Application February 7, 1935, Serial No. 5,502

4 Claims. (Cl. 220—55)

The present invention has for its object to produce a simple and novel means whereby covers for openings in walls may be securely attached to the walls by clamp devices actuated by screws instead of having the screws screw-threaded directly into such walls.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a view, partly in side elevation and partly in section, showing an outlet box embodying the present invention, the cover lying unfastened upon the box; Fig. 2 is a view corresponding to the cross-sectional portion of Fig. 1, the clamps having been tightened to secure the cover; Fig. 3 is a sectional view on a large scale, showing fragments of the box and cover and one of the clamps; and Fig. 4 is a bottom plan view of the cover, the holding and guide device for one of the dogs being shown in section.

Referring to the drawing, I represents a wall of an outlet box having therein an opening 2 adapted to be closed by a suitable cover 3 engaged with the wall over the opening. The cover is adapted to be secured in place by two clamping devices, one at each end, although there may be any desired number of such devices depending upon the kind, size and shape of cover.

Each clamping device consists of a screw 4 extending loosely through a hole 5 in the cover and screwed into a dog 6. The hole 5 is preferably large enough to enable the screw to swing through a considerable angle. The dog is simply a long, thin, narrow nut. One end of the dog is adapted to extend past the margin of the opening in the box and underlie the adjacent part of the wall 1. The other end of the dog, which may be termed the inner end, has a part designed to engage with the under side of the cover and serve as a fulcrum upon which the dog may rock. The fulcrum may conveniently be formed by bending the inner end of the dog laterally toward the cover, as indicated at 7. With this construction, the screw can always draw the ends of the dog firmly into engagement with the cover and the box wall, the clamping action of the dog being that of a lever fulcrumed at one end.

Means must be provided to hold the clamping dogs against rotation about the axes of their respective screws. This can conveniently be accomplished by mounting on the under side of the cover suitable keepers that will permit the desired freedom of movement for the dogs and prevent other movement. In the arrangement shown, each keeper consists of a pair of arms or tines 8 standing at right angles to the cover with the inner end of the corresponding dog lying between them. Each keeper may conveniently be a part of a metal piece welded or otherwise fixed to the cover. Thus there may be a single long plate 9 lying flat against the inner or under side of the cover and spot-welded thereto, as indicated at 10; the ends of the plate being bent transversely into U's 11 whose arms are spaced apart and the outermost arm of each of which is divided or forked to produce the aforesaid tines. Thus the dogs may move freely from and toward the cover and they may rock in a plane extending lengthwise of and at right angles to the cover, as indicated in Fig. 3; but they cannot rotate about axes at right angles to the cover.

While the outer ends of the dogs move outwardly to some extent toward the corresponding ends of the cover, when they rock from positions corresponding to the dotted line position to the full line in Fig. 3, the parts are preferably so proportioned that an endwise movement of the cover is required to place it on the box or remove it therefrom. Thus as the cover in Fig. 1 is slid toward the left the dog on the right hand end is carried out from under the overhanging part of the wall 1 and the right hand end of the cover may therefore be raised to lift the dog out of the box. The cover may then be shifted toward the right and be lifted off the box. Similarly, in placing the cover on the box the dog at one end is inserted through the box opening while the cover is held in an inclined position and is then shifted endwise so that the dog at the other end may enter the box when the cover is swung into parallelism with the adjacent box wall. Thus, after the cover has been slid along the box into its final position, as shown in Fig. 1, the tightening of the screws causes the cover to be firmly clamped to the box, as in Fig. 2.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. In combination, a box having an opening in a wall thereof, a cover for said opening, a screw passing loosely through the cover near the edge thereof, a clamping dog in the form of an elongated nut on the inner end of the screw, the inner end of the dog having a part extending laterally therefrom toward the cover, and means on the cover to hold the dog in a position to cause its outer end to underlie said wall beside said opening and prevent the dog from turning about the axis of the screw.

2. In combination, a box having an opening in a wall thereof, a cover for said opening, a screw passing loosely through the cover near the edge thereof, a clamping dog in the form of an elongated nut on the inner end of the screw, and means on the cover to hold the dog in a position to cause its outer end to underlie said wall beside said opening and prevent the dog from turning about the axis of the screw, the inner end of the dog having a part adapted to engage the cover and serve as a fulcrum on which the dog may rock.

3. In combination, a box having an opening in a wall thereof, a cover for said opening, said cover having a keeper on the inner side, near one edge, said keeper comprising two arms spaced apart from each other, a screw passing loosely through the cover near said keeper so as to be capable of swinging through a substantial angle in a plane transverse to said edge, and a dog in the form of a long nut on the inner end of the screw, said dog lying between said arms and being held against lateral swinging movements thereby.

4. In combination, a box having an opening in a wall thereof, a cover for said opening, said cover having a keeper on the inner side, near one edge, said keeper comprising two arms spaced apart from each other, a screw passing loosely through the cover outwardly from and near said keeper, and a dog in the form of a long nut on the inner end of the screw, said dog lying between said arms and being held against lateral swinging movements thereby, the outer end of said dog lying in a position to engage with the inner side of said wall when the cover is on and the inner end of the dog having thereon a part to engage with said cover and serve as a fulcrum for rocking movements of the dog when the screw is tightened.

NILS A. TORNBLOM.